(12) United States Patent
Cok et al.

(10) Patent No.: US 7,462,811 B2
(45) Date of Patent: Dec. 9, 2008

(54) LIGHT DETECTION CIRCUIT

(75) Inventors: Ronald S. Cok, Rochester, NY (US); Joshua M. Silbermann, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 84 days.

(21) Appl. No.: 10/997,488

(22) Filed: Nov. 24, 2004

(65) Prior Publication Data

US 2006/0108511 A1    May 25, 2006

(51) Int. Cl.
*G01J 1/44* (2006.01)
(52) U.S. Cl. ............................. 250/214 AL; 250/214 R
(58) Field of Classification Search ............. 250/214 R, 250/227.16, 227.18, 214 AL; 345/45; 348/297
See application file for complete search history.

(56) References Cited

U.S. PATENT DOCUMENTS

| | | | | |
|---|---|---|---|---|
| 4,737,942 A * | 4/1988 | Nishibe | ...................... | 368/118 |
| 5,479,208 A * | 12/1995 | Okumura | .................... | 348/301 |
| 5,773,816 A | 6/1998 | Grodevant | | |
| 5,991,467 A * | 11/1999 | Kamiko | ...................... | 382/312 |
| 6,295,413 B1 * | 9/2001 | Ogasawara | ................. | 396/155 |
| 6,350,981 B1 * | 2/2002 | Uno | ........................ | 250/214 R |
| 6,392,617 B1 * | 5/2002 | Gleason | ........................ | 345/82 |
| 6,489,631 B2 | 12/2002 | Young et al. | | |
| 6,559,788 B1 * | 5/2003 | Murphy | ...................... | 341/164 |
| 6,740,860 B2 | 5/2004 | Kobayashi | | |
| 6,777,660 B1 * | 8/2004 | Lee | .......................... | 250/208.1 |
| 2001/0040632 A1 * | 11/2001 | Yang et al. | .................. | 348/294 |
| 2002/0030152 A1 * | 3/2002 | Afghahi | .................... | 250/208.1 |
| 2002/0113887 A1 * | 8/2002 | Iimura et al. | ................ | 348/310 |
| 2003/0001080 A1 | 1/2003 | Kummaraguntla et al. | | |
| 2003/0076432 A1 * | 4/2003 | Luo et al. | .................... | 348/308 |
| 2003/0107671 A1 * | 6/2003 | Castro et al. | ............. | 348/395.1 |
| 2004/0056180 A1 * | 3/2004 | Yu | ........................... | 250/214.1 |
| 2004/0141074 A1 * | 7/2004 | Milkov et al. | ............... | 348/296 |
| 2004/0183759 A1 * | 9/2004 | Stevenson et al. | ............. | 345/82 |

FOREIGN PATENT DOCUMENTS

| | | |
|---|---|---|
| EP | 0 675 345 | 10/1995 |
| EP | 1 467 408 | 10/2004 |
| JP | 2002-297096 | 10/2002 |

* cited by examiner

*Primary Examiner*—Georgia Y. Epps
*Assistant Examiner*—Kevin Wyatt
(74) *Attorney, Agent, or Firm*—Andrew J. Anderson; Stephen H. Shaw; Raymond L. Owens

(57) ABSTRACT

A circuit for detecting light comprising: a) a light-integrating photosensor circuit responsive to light for producing a variable voltage signal representing the accumulation of the light over time; and b) a measurement circuit for receiving a time measurement signal and the variable voltage signal to produce an output value representing the time required for the variable voltage signal to reach a predetermined voltage level, wherein the output value is proportional to the light accumulated during the required time.

22 Claims, 5 Drawing Sheets

LIGHT DETECTION CIRCUIT

FIELD OF THE INVENTION

The present invention relates to photosensor circuits and more particularly to solid-state flat-panel displays having photosensors for sensing ambient illumination.

BACKGROUND OF THE INVENTION

Flat-panel displays such as liquid-crystal displays (LCDs) or organic light emitting diode (OLED) displays are useful in a wide variety of applications under a wide variety of environmental conditions. When viewed in a dark environment (little ambient radiation), such displays need not be as bright as when viewed in a lighter environment (more ambient radiation). If the display light output is adjusted periodically to compensate for ambient light conditions, the display can maintain a constant relative brightness with respect to the ambient illumination even if the ambient illumination changes. In a bright environment, this will increase display brightness to improve visibility. In a dark environment, this will increase display device lifetime and reduce power usage by reducing unnecessary display brightness.

The use of photosensors with displays to detect ambient light and adjusting the brightness of the display in response to ambient illumination is known. Efficient silicon photosensors are available and generally provide a current proportional to the light incident on the sensor. These photosensors are constructed on silicon substrates and may have a wide dynamic range. Such sensors can be combined with displays to provide ambient sensing. For example, see JP 2002-297096-A, which describes a circuit for providing ambient compensation to an electro-luminescent display. However, as implemented, the sensor is separate from the display and senses the light at a single point. This increases the cost, number of components, and size of the device and does not directly measure the light incident on the display itself.

It is known to integrate a light sensor on an active-matrix display device for the purpose of sensing light emitted from the display device itself. See, for example, U.S. Pat. No. 6,489,631 issued Dec. 3, 2002 to Young et al., which describes a display having integrated photosensors for sensing light emitted by a light emitting element of the display. There is no disclosure of the use of such photosensors for detecting ambient light, however, and the arrangement of the sensor coupled with a light emitter limits the size of the photosensor and its ability to sense ambient light.

When providing ambient compensation to a display, it is important that the light-sensing device provide a signal having a wide dynamic range representative of the ambient illumination. The human visual system can effectively detect light from very dark ambient conditions of only a few photons to very bright outdoor conditions greater than 75,000 lux. However, tests conducted by applicant demonstrate that photosensors constructed on flat-panel displays using thin-film technology do not have the efficiency of photosensors constructed on silicon substrates and do not have the sensitivity necessary to provide a signal representative of lower light levels, for example <100 cd/m2, where displays are often used. Nor do they have the dynamic range necessary to accommodate the range of the human visual system.

Typical circuits used in combination with photosensors such as, for example, photodiodes or phototransistors, rely upon either direct measurement of the current produced or an accumulation of the current and measurement of the charge accumulated. In the first case, the current produced by a typical thin-film photosensor in a flat-panel display is very small, on the order of femto-Amps, making the reliable detection of the current very difficult. In the second case, the charge is typically converted to a voltage signal that is sensed with an analog-to-digital converter (ADC). For example, U.S. Pat. No. 6,740,860 entitled "Photodetector, photosensing position detector, coordinate input device, coordinate input/output apparatus, and photodetection method" issued 2004 May 25 describes a circuit using photosensors and ADC circuits. However, analog-to-digital converter circuits are complex and expensive and difficult to fabricate on a glass substrate such as is commonly found in a flat-panel display.

There is a need therefore for an improved photosensor circuit for the detection of light, particularly for detection of ambient light incident on an active-matrix flat-panel display.

SUMMARY OF THE INVENTION

In accordance with one embodiment, the invention is directed towards a circuit for detecting light comprising: a) a light-integrating photosensor circuit responsive to light for producing a variable voltage signal representing the accumulation of the light over time; and b) a measurement circuit for receiving a time measurement signal and the variable voltage signal to produce an output value representing the time required for the variable voltage signal to reach a predetermined voltage level, wherein the output value is proportional to the light accumulated during the required time.

In accordance with a further embodiment, the invention is directed towards a flat-panel display, comprising a) a substrate and a plurality of organic light emitting diodes located thereon in a display area; and b) a circuit for detecting light according to the above embodiment, wherein at least a portion of the circuit is formed on the substrate. In such further embodiment, the circuit may detect ambient light incident on the display or detect light emitted by the organic light emitting diodes.

DETAILED DESCRIPTION OF THE INVENTION

Figure 1:
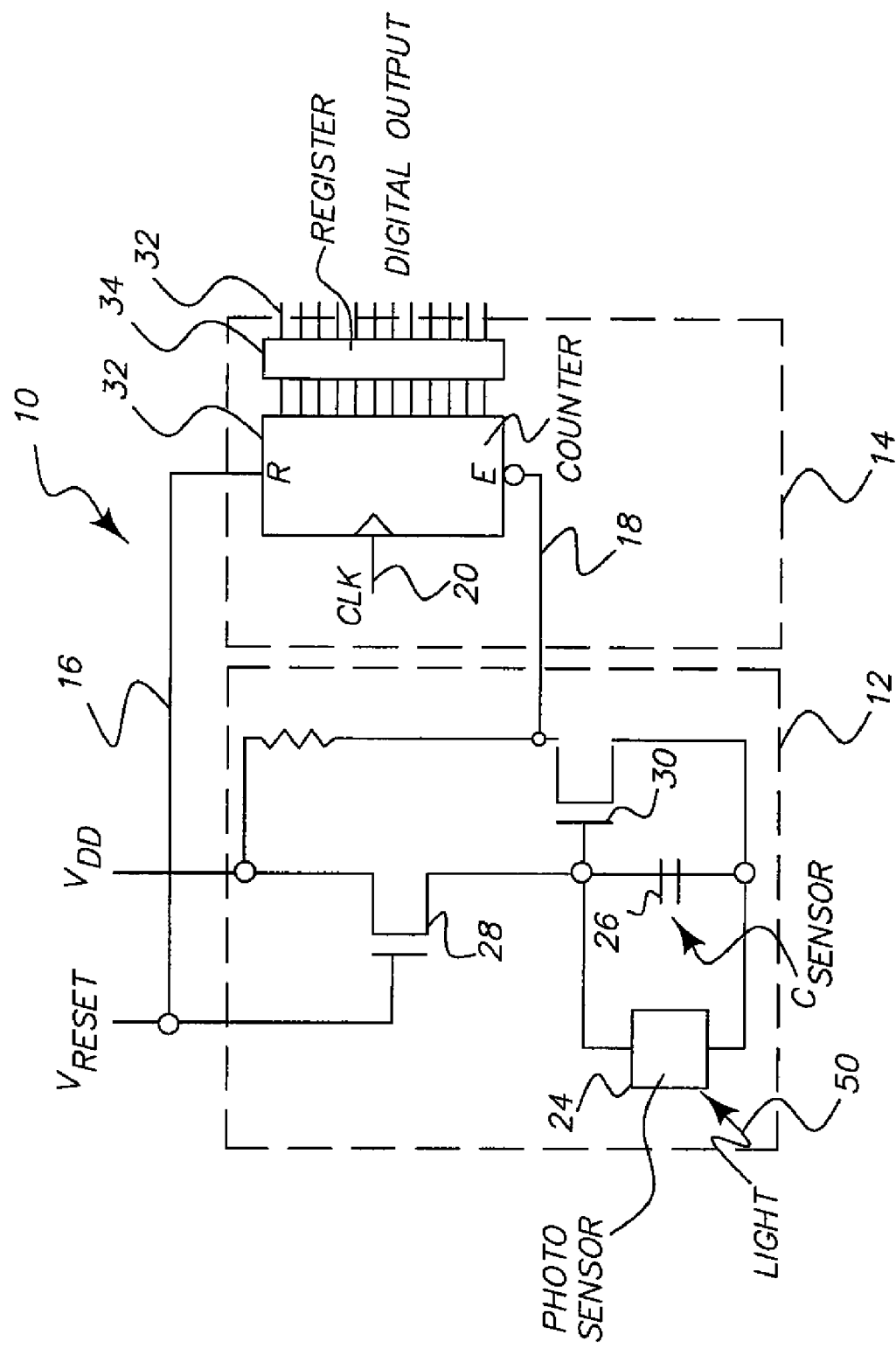
FIG. 1 is a schematic diagram of a circuit according to one embodiment of the present invention.

Referring to FIG. 1, a circuit 10 for detecting light comprises a light-integrating photosensor circuit 12 responsive to light 50 for producing a variable voltage signal 18 representing the accumulation of the light 50 over time; and a measurement circuit 14 for receiving a time measurement signal 20 and the variable voltage signal 18 to produce an output value 22 representing the time required for the variable voltage signal 18 to reach a predetermined voltage level, wherein the output value 22 is proportional to the light accumulated during the required time.

The light integrating photosensor circuit 12 may have one or more photosensor(s) 24. In a particular embodiment, such photosensor(s) may be located on a flat-panel display substrate. For example, thin-film circuits may be used. The circuit 12 can include a capacitor 26 that is discharged periodically through the photosensor(s) 24, a reset transistor 28 for periodically recharging the capacitor 26 and an amplifying transistor 30 for creating the variable voltage signal 18. This circuit 12 has been constructed with a thin-film silicon photosensor on a glass substrate using a process compatible with the manufacture of active-matrix OLED flat-panel display devices and successfully tested. The variable voltage signal 18 is connected to a measurement circuit 14 that may comprise a counter 32 including enable and reset circuitry and supplied with a time measurement clock signal 20 to produce a digital output signal 22. The counter 32 may include a storage register 34 for storing a count value or, alternatively, a separate register 34 or other circuitry may be provided to store the count value and controlled with suitable timing and control signals. A reset circuit within the counter 32 sets the counter value to zero and an enable circuit within the counter 32 enables the counter 32 to increment.

In operation, a periodic reset signal 16 first charges the capacitor 26 and resets the counter 32. When the capacitor 26 is charged, the variable voltage signal 18 output from the photosensor circuit 12 is low and the enable circuit enables the counter 32 to increment at a rate dependent on the time measurement clock frequency. As time passes, the counter 32 will increment as the capacitor 26 discharges. At some time, the variable voltage signal 18 will reach a predetermined voltage level corresponding to the voltage at which the counter's digital input will switch, and thereby disable the counter 32. The output value of the counter 32 is then proportional to the light incident on the photosensor(s) 24 accumulated during the time required to reach the pre-determined voltage level since the periodic reset signal 16 reset the counter 32 and represents the intensity of the light. At the end of the period, the periodic reset signal 16 again-charges the capacitor 26 and resets the counter 32 to repeat the cycle, thus providing a periodic digital output value 22 representing the intensity of the ambient light 50.

The voltage at which the voltage signal 18 will disable the counter 32 directly affects the value the counter 32 will reach in any given period. Digital circuitry found in typical prior-art counters switch at a prescribed predetermined voltage dependent on the manufacturing process, materials, and design. By measuring how long the photosensor circuit 12 takes to reach the predetermined switching voltage level, a very precise and consistent measure of the intensity of the light incident on the photosensor(s) 24 is obtained without the use of complex analog-to-digital sensors necessary to measure the actual voltage of the variable voltage signal 18.

While the present invention may be employed to make a single measurement of light, it is anticipated that the invention will be used periodically to repeatedly measure the brightness of the incident light. Hence, it is useful to periodically reset the photosensor circuit and to make repeated measurements of the light brightness. Since the brightness of the light can vary, and since the measurement circuit has a limited dynamic range (e.g. a limited number of bits in the counter), it can be helpful to vary the period of the periodic reset signal. Further, it may be helpful to adjust the frequency of the time measurement signal to provide more precise measurements.

The period of the reset signal 16 may be varied to provide more frequent light intensity measurements over a greater dynamic range. If the period is very large and the incident light is very bright, the circuit will saturate and the counter disabled before the end of the period. In this case, the circuit cannot measure any brighter light and the period of the reset signal may be decreased to provide more frequent updates. If the period is too short (the light is too dim), the counter will be reset before it is disabled, and the circuit is effectively measuring the period of the reset signal. In this case, the reset period should be increased so as to collect more light. Hence, the reset signal may be varied to provide as frequent an update as possible while providing an accurate measurement of the incident light 50. The dynamic range of the circuit response is not affected by the period while the precision of the measurement is controlled by the frequency of the clock 20 and the variability of the-counter enable circuitry.

The range and resolution of measurement provided by the measurement circuit 14 is dependent on the number of bits in the counter and the frequency of the time measurement signal. If the light is very dim or very bright, it is possible that only a few of the measurement levels may be employed. To optimize the available range of measurement, it is preferred to set the resolution of the time measurement signal set in response to the time at which the variable voltage signal reaches a predetermined voltage level. In other words, it is preferred that the counter reach or approach its maximum value at the time that the variable voltage signal reaches the predetermined voltage level for the brightest light anticipated. This can be done by adjusting the frequency of the time measurement signal, for example by employing a counter to generate the time measurement signal and changing the number at which the counter resets.

If the counter value reaches a maximum before the variable voltage signal reaches the predetermined voltage level, the frequency of the time measurement signal can be reduced (the clock is slowed down). If the variable voltage signal reaches the predetermined voltage level well before the counter value reaches its maximum, the frequency of the time measurement signal can be increased (speeded up). If an analog time measurement signal is employed, for example a voltage ramp signal, the slope of the ramp can be decreased to effectively slow down the measurement or the slope of the ramp can be increased to effectively speed up the measurement.

In general, it is helpful if the resolution of the time measurement is adequate to readily distinguish the different light exposures found in a particular application. If the brightest light exposure results in the variable voltage signal reaching the predetermined voltage level within the first half of the period, an adjustment in the time measurement signal or the period length may be employed to more effectively utilize the available bits available in the counter.

Figure 5:
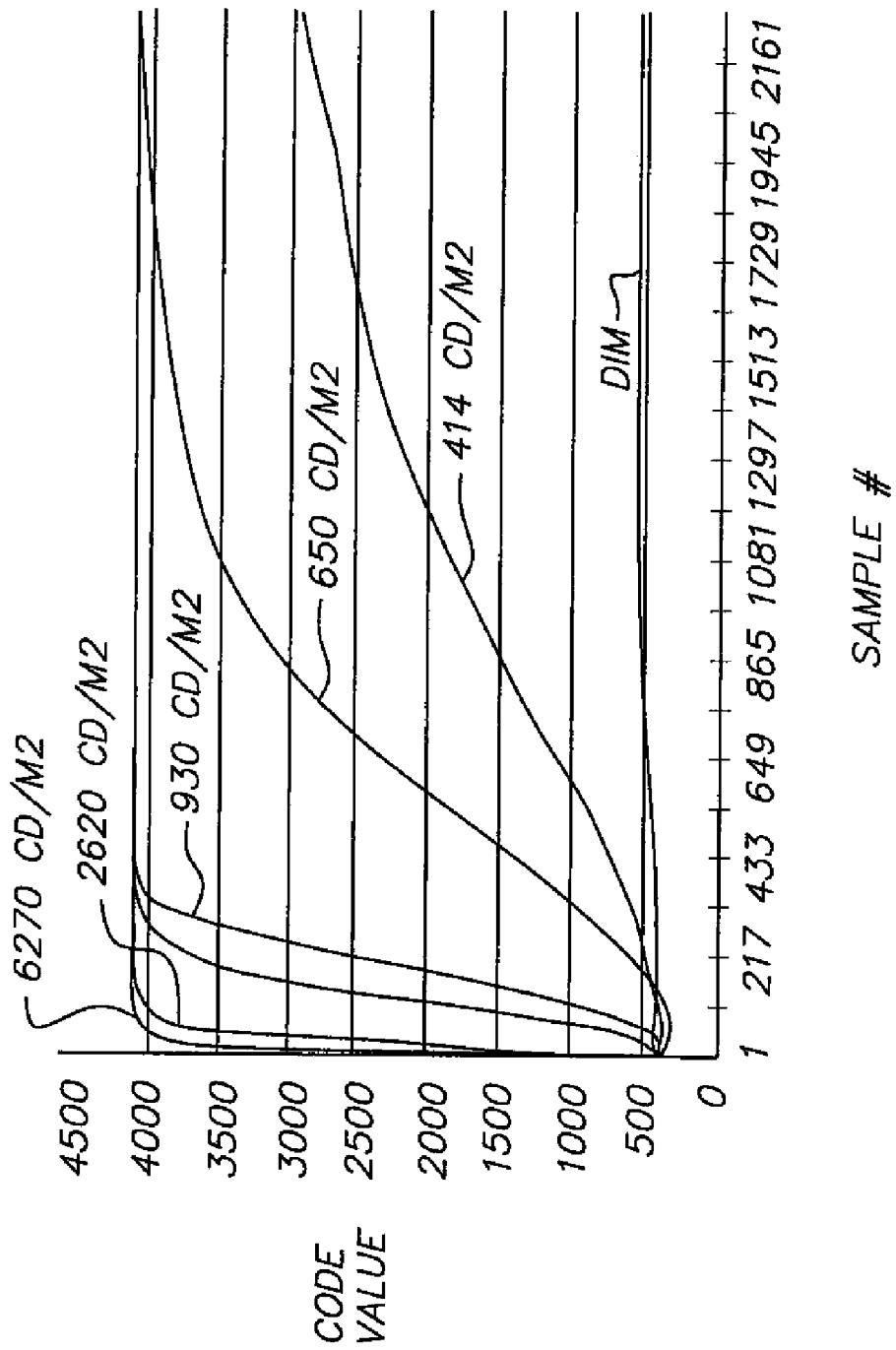
FIG. 5 is a graph illustrating the output from a photosensor circuit as employed in an embodiment of the present invention.

Referring to FIG. 5, a graph illustrates the variable voltage signal output from a photosensor circuit as employed in one embodiment of the present invention. The variable voltage signal is sampled over time, and the voltage measured in Code Value units. Each Curve represents a variable voltage signal obtained under different ambient illumination conditions. As can be seen from this graph, under dim conditions, the variable voltage signal labeled Dim starts at a low value and increases slowly. Under relatively brighter conditions (higher $cd/m^2$), the variable voltage signal starts at a low value and increases more rapidly. Therefore, the time at which the variable voltage signal reaches a given threshold depends upon the illumination conditions.

Figure 2:
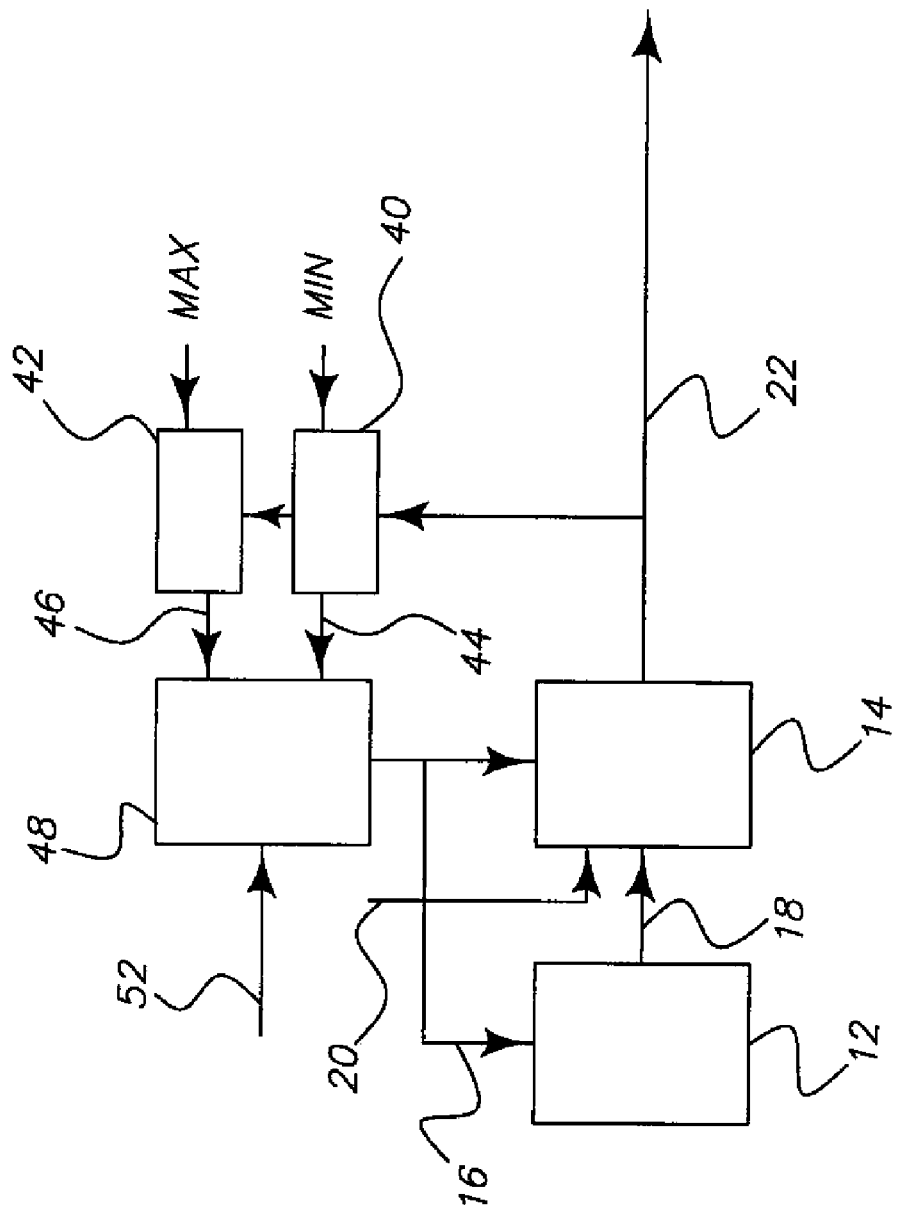
FIG. 2 is a schematic diagram of a circuit according to an alternative embodiment of the present invention.

The period of the periodic reset signal 16 may be varied by providing a comparison of the count with a maximum or minimum value. Referring to FIG. 2, the digital output 22 can be compared to minimum and maximum values using comparators 40 and 42 respectively. If the digital output value 22 equals the minimum value, a period value stored in a digital down counter 48 incremented by a clock signal 52 and employed to control the reset signal 16 may be incremented using an increment signal 44 to increase the reset period. Alternatively, the clock frequency of the counter 32 relative to the digital down counter 48 may be increased. If the digital output value equals the maximum value, the period value may be decremented using a decrement signal 46 to decrease the reset period. Preferably, the period of the time measurement signal 20 is several orders of magnitude smaller than the period of the reset signal 16.

Figure 3:
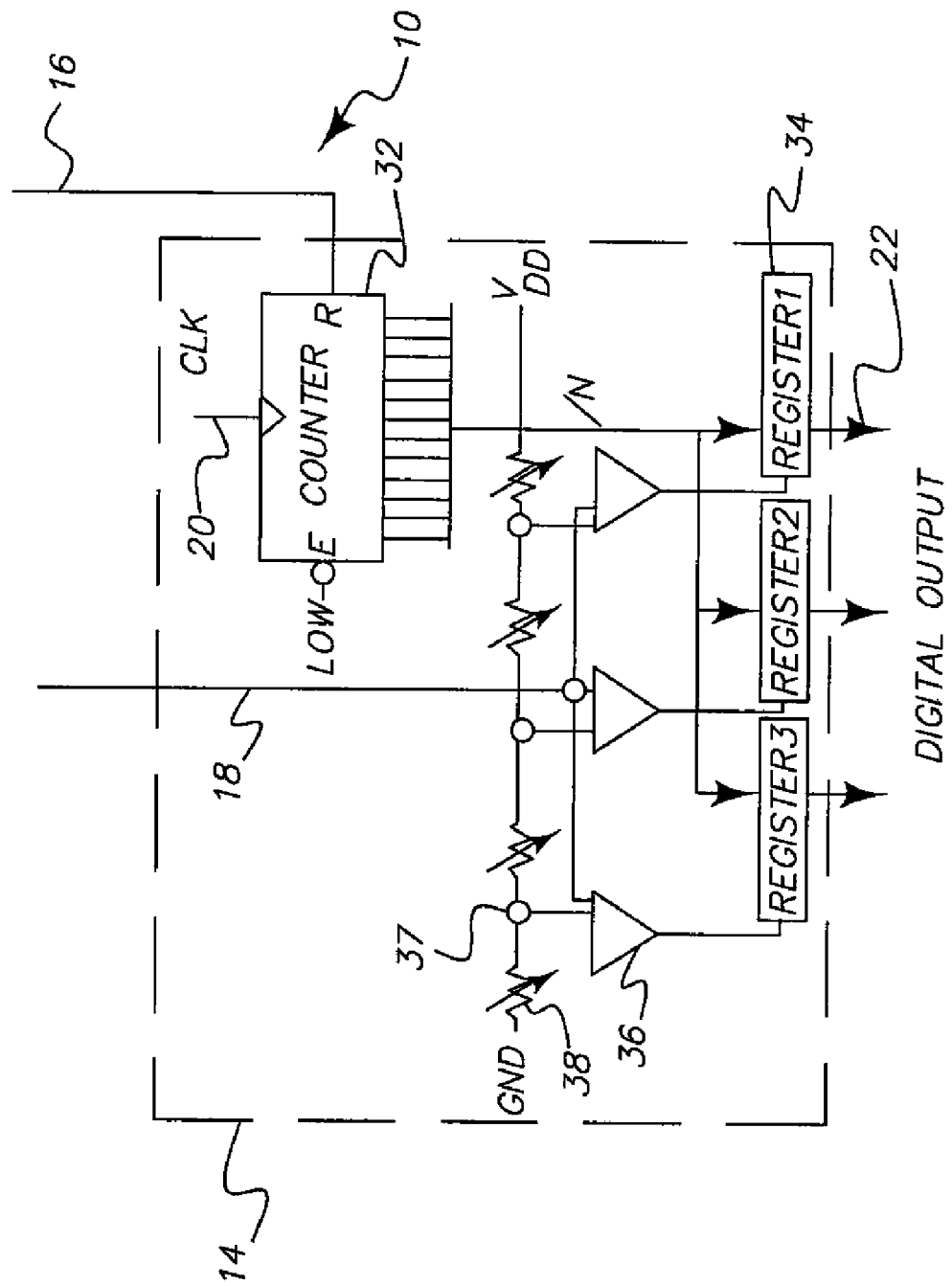
FIG. 3 is a schematic diagram of a circuit according to another alternative embodiment of the present invention.

The embodiment of the present invention described in FIG. 1 produces a single time value depending on the switching voltage of the counter enable input. In an alternative embodiment of the present invention, a plurality of digital time-based signals 22 may be found. Referring to FIG. 3, in one example the counter 32 is cleared by the reset signal (as in FIG. 1) but the output value from the counter 32 is applied to the inputs of three registers 34. Each register is triggered to store its input counter value by the output of a different comparator 36. Each comparator is connected to the variable voltage signal 18 and a different comparison voltage 37 created by a series of resistors 38. The resistors 38 may be variable (as shown) or permanently fixed. In operation, the registers 34 are triggered to store their counter input value whenever the corresponding comparator 36 indicates that the photosensor voltage signal 18 matches the comparison voltage 37. The additional values provide information about the shape of the variable photosensor voltage signal 18 over time and can be used to improve the measurement of the illumination incident on the photosensor. Moreover, the plurality of time-based signals using different voltage comparisons expands the dynamic range of the system. For example, a very dim light source may not trigger a single comparator in a reasonable length of time, while another comparator based on a lower voltage might, thus enabling improved detection at very low light levels. Likewise, a very bright light source may not be distinguishable from other bright lights by a single comparator, while another comparator based on a higher voltages might, thus enabling improved detection at very bright light levels.

Figure 4:
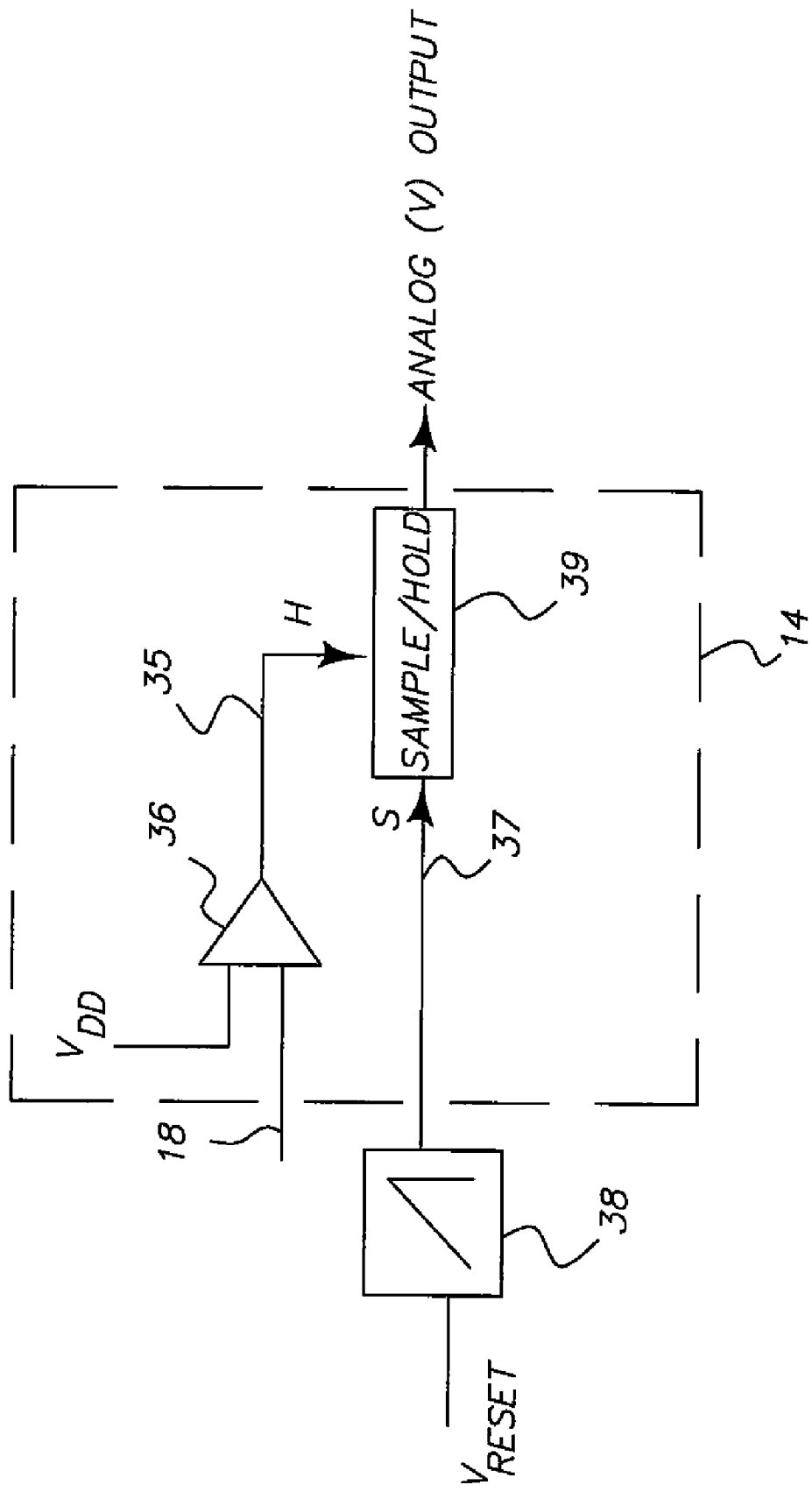
FIG. 4 is a schematic diagram of a circuit according to yet another alternative embodiment of the present invention.

The embodiments of the present invention shown in FIGS. 1 and 3 provide a digital output. While this is useful, the present invention may also be employed in an all-analog embodiment. Referring to FIG. 4, a voltage ramp generator 38 is used to provide an analog equivalent to a clock that is reset by the same signal that resets the photosensor in FIG. 1. The voltage ramp generator 38 provides, a continuously increasing or decreasing signal that varies with time so that the voltage of the signal at any given time uniquely identifies the time. The voltage ramp signal 37 output by the voltage ramp generator 38 is connected to the input of a sample-and-hold circuit 39. The variable photosensor voltage signal 18 is compared to a trigger voltage (shown as Vdd although any voltage may be used) by a comparator 36 and, when the variable photosensor voltage 18 matches the trigger voltage, initiates a hold signal 35 to signal a sample-and-hold circuit 39 to sample its input signal. The voltage of the sampled signal will correspond uniquely to the time at which it was acquired and the time at which the photosensor voltage signal 18 reached the trigger voltage. As is described in FIG. 3 for a digital output circuit, the sample-and-hold circuit 39 and the comparator 36 may be replicated and, with the use of different trigger voltages, may be employed to find the voltage of the photosensor signal at a variety of times to provide information about the shape of the photosensor voltage signal over time and can be used to improve the measurement of the illumination incident on the photosensor.

The present invention may be employed in a flat-panel display device to compensate the display for ambient illumination, for example an organic light-emitting diode flat-panel display. When the digital output signal 22 indicates a bright ambient environment, a controller employed to control a display may increase the brightness of the display, thereby improving the visibility of the display contents. Alternatively, if the digital output signal 22 indicates a bright ambient environment, a controller employed to control the display may decrease the brightness of the display, thereby saving power and lifetime of the display without reducing the visibility of the display contents. The response of the display to ambient illumination may be iterative; a digital output signal may be detected, the output of the display adjusted, a digital signal detected again, the output re-adjusted and so on. This is useful for mobile devices that may be transported from one ambient condition to another, or for devices with a variable ambient environment.

Photosensor 24 may be any thin-film light-sensitive device suitable for use within such a flat-panel display system. For example, silicon or organic photodiodes, photo-capacitors or phototransistors may be employed. Thin-film materials may be deposited, e.g., by evaporation or photolithographic processes as known in the art (typically in layers less than 1 micrometer thick). These photosensors and circuit elements may be integrated with a flat-panel display to provide an integrated solution. When integrated with a display, any portion of, or all of, the circuits 12 and/or 14 may be constructed using thin-film transistors and electrical components as are known in the flat-panel display art. A suitable photosensor circuit is disclosed in co-pending, commonly assigned U.S. application Ser. No. 10/694,560, the disclosure of which is hereby incorporated by reference. Thin-film manufacturing techniques for photo-transistors, capacitors, and resistors are known.

A typical flat-panel display includes a rigid or flexible substrate, typically made of glass or-plastic, together with a plurality of light-emitting elements, such as organic light emitting diode materials (OLEDs) or light controlling elements having polarizing layers in combination with an emissive back light, such as LCDs. The individual light emitting elements may be controlled using thin-film transistors and capacitors together with an external controller to provide data, power, and timing signals.

A plurality of thin-film photosensors 24 can be electrically connected in common to provide one integrated photo signal or, alternatively, they can be separately addressed or their output combined. The plurality of photosensors 24 may be located near each other or dispersed over a flat-panel display. A greater number or size of integrated photosensors 24 can increase the signal, thereby improving the responsiveness of the ambient light detection. These may, or may not, have common circuit elements.

The present invention may be used in both top- and bottom-emitting OLED flat-panel display devices. A light-emitting display may be an organic light emitting diode (OLED) display that includes multiple supporting layers such as light-emitting layers, hole injection, hole transport, electron injection, and electron transport layers as is known in the art. Any or all portions of the photosensor circuit 12 may be deposited in a common step with active-matrix display circuitry and may include identical materials to simplify processing and manufacturing. As demonstrated by applicant, thin-film structures used for active-matrix OLED displays may be employed to form the photosensors 24 and detection circuit 12. There are a variety of ways in which the photosensors 24 can be connected that depend on various factors such as the layout of the display and the conductivity of the electrodes and signal lines connected to the photosensors.

Any or all of the circuits 12 or 14 can be integrated directly onto the same substrate as a flat-panel display device or it can be implemented externally to a display. In general, higher performance and greater accuracy can be achieved by integrating the circuitry directly with the display device but this may not be desirable for all display devices.

The present invention may be employed in a flat-panel display to detect ambient light, as described above. Alternatively, in another embodiment of the present invention, the photosensors 24 may be located in association with a light-emitting element of a flat-panel display. In this embodiment, the photosensors 24 may be employed to detect the light emitted from the display, thereby measuring the light output from the light-emitting element and providing information regarding light output, for example intensity, efficiency, aging, and color.

In a preferred embodiment, the invention is employed in a flat-panel device that includes Organic Light Emitting Diodes (OLEDs) which are composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The invention has been described in detail with particular reference to certain preferred embodiments thereof, but it will be understood that variations and modifications can be effected within the spirit and scope of the invention.

PARTS LIST 10 circuit
12 photosensor circuit
14 counter circuit
16 reset signal
18 voltage signal
20 clock signal
22 digital output signal
24 photosensor
26 capacitor
28 reset transistor
30 amplifying transistor
32 counter
34 register
35 trigger signal
36 comparator
37 ramp signal
38 ramp signal generator
39 sample-and-hold circuit
40 comparator
42 comparator
44 increment signal
46 decrement signal
48 down counter
50 light
52 clock

The invention claimed is:

1. A circuit for detecting light comprising:
   a) a substrate, a light-integrating thin-film photosensor circuit formed on the substrate and a charge-accumulation circuit formed on the substrate comprised of a physical capacitor, a reset transistor for charging the physical capacitor in response to a reset signal, a photo sensor that discharges the physical capacitor in response to ambient light, and an amplifier responsive to the physical capacitor for creating a variable voltage signal, representing the accumulation of the ambient light over time; and
   b) a thin-film measurement circuit formed on the substrate for receiving a time measurement signal and the variable voltage signal to produce an output value representing the time required for the variable voltage signal to reach a predetermined voltage level, wherein the output value is proportional to the ambient light accumulated during the required time.

2. The circuit of claim 1 wherein the measurement circuit is a digital circuit having a trigger level corresponding to the predetermined voltage level, the time measurement signal is a digital clock signal, and the output value is a digital value.

3. The circuit of claim 1 wherein the measurement circuit is an analog circuit, the time measurement signal is a voltage ramp signal, and the output value is an analog voltage value.

4. The circuit of claim 1, wherein the measurement circuit produces a plurality of output values representing the times at which the variable voltage signal reaches a corresponding plurality of predetermined voltage levels.

5. The circuit claimed in claim 1, wherein the photosensor circuit comprises a photodiode, photocapacitor, or phototransistor photosensor.

6. The circuit claimed in claim 1, wherein the photosensor circuit comprises an organic photosensor.

7. The circuit claimed in claim 1, wherein the photosensor circuit comprises a silicon photosensor.

8. The circuit claimed in claim 1, wherein the photosensor circuit comprises a thin-film circuit.

9. The circuit claimed in claim 1 wherein the measurement circuit comprises a thin-film circuit.

10. The circuit claimed in claim 1 wherein at least a portion of the photosensor circuit is formed on the substrate of a flat-panel display.

11. The circuit claimed in claim 1 wherein at least a portion of the measurement circuit is formed on the substrate of a flat-panel display.

12. A flat-panel display, comprising
   a) a substrate and a plurality of organic light emitting diodes located thereon in a display area; and
   b) the circuit for detecting ambient light according to claim 1, wherein at least a portion of the circuit is formed on the substrate.

13. The circuit claimed in claim 1 wherein the photosensor circuit is further responsive to a reset signal provided by the measurement circuit.

14. The circuit claimed in claim 13, wherein the period of the reset signal is variable.

15. The circuit claimed in claim 13 wherein the period of the reset signal is increased if the variable voltage signal does not reach the predetermined voltage level within the period.

16. The circuit of claim 13 wherein resolution of the time measurement signal is decreased when the period of the reset signal is increased.

17. The circuit claimed in claim 13 wherein the period of the reset signal is decreased if the variable voltage signal reaches the predetermined voltage level within the first half of the period.

18. The circuit claimed in claim 13 wherein the reset signal is generated by a digital counter.

19. The circuit of claim 1 wherein resolution of the time measurement signal is set in response to the time at which the variable voltage signal reaches a predetermined voltage level.

20. The circuit of claim 19 wherein the time measurement signal is a digital clock signal, and the resolution is set by adjusting the frequency of the digital clock signal.

21. The circuit of claim 19 wherein the time measurement signal is a voltage ramp signal, and the resolution is set by adjusting the slope of the ramp.

22. The circuit of claim 19 wherein the resolution of the time measurement signal is increased if the variable voltage signal reaches the predetermined voltage level within the first half of the period.

* * * * *